(12) United States Patent
Cross et al.

(10) Patent No.: US 11,230,476 B2
(45) Date of Patent: Jan. 25, 2022

(54) DISSOLVED AIR FLOTATION USE WITH CATIONIC METAL PROCESSING FLUIDS

(71) Applicant: Total Marketing Services, Paris la Defense (FR)

(72) Inventors: Alan E. Cross, Yardley, PA (US); John M. Burke, Kirtland, OH (US); Robert L. Blithe, Lansdowne, PA (US)

(73) Assignee: TOTAL MARKETING SERVICES, Paris la Defense (FR)

( * ) Notice: Subject to any disclaimer, the term of this patent is extended or adjusted under 35 U.S.C. 154(b) by 1289 days.

(21) Appl. No.: 15/108,348

(22) PCT Filed: Dec. 29, 2014

(86) PCT No.: PCT/US2014/072470
§ 371 (c)(1),
(2) Date: Jun. 27, 2016

(87) PCT Pub. No.: WO2015/103095
PCT Pub. Date: Jul. 9, 2015

(65) Prior Publication Data
US 2016/0326017 A1 Nov. 10, 2016

Related U.S. Application Data

(60) Provisional application No. 61/921,691, filed on Dec. 30, 2013.

(51) Int. Cl.
*C02F 1/24* (2006.01)
*B03D 1/02* (2006.01)
(Continued)

(52) U.S. Cl.
CPC ............... *C02F 1/24* (2013.01); *B03D 1/028* (2013.01); *B03D 1/1431* (2013.01); *B21D 37/18* (2013.01); *C02F 2103/16* (2013.01)

(58) Field of Classification Search
CPC ......... B03D 1/028; B03D 1/1431; C02F 1/24; B21D 37/18
(Continued)

(56) References Cited

U.S. PATENT DOCUMENTS 4,492,636 A 1/1985 Burke
5,851,434 A 12/1998 Galante
(Continued)

FOREIGN PATENT DOCUMENTS

WO WO-02/31073 4/2002

OTHER PUBLICATIONS

International Search Report dated Apr. 30, 2015 in corresponding International Patent Application No. PCT/US2014/072470, filed Dec. 29, 2014.
(Continued)

*Primary Examiner* — Thomas M Lithgow
(74) *Attorney, Agent, or Firm* — Shumaker, Loop & Kendrick, LLP (57) ABSTRACT

In an effort in solving the difficulties with cleaning cationic metal processing fluids and/or emulsions, processes for cleaning a metal processing fluid which is substantially free of fatty acids is provided herein and includes treating the metal processing fluid with dissolved air floatation. Also provided are processes for deforming metals and removing suspended foreign matter from a contaminated metal processing fluid and/or emulsions which are substantially free of fatty acids is provided and include the use of DAF technology. In one embodiment, the process is performed in the absence of a filter. In another embodiment, the process is performed in the absence of a filter which is capable of removing suspended foreign material in the contaminated metal processing fluid.

20 Claims, 4 Drawing Sheets

(51) Int. Cl.
  *B03D 1/14* (2006.01)
  *B21D 37/18* (2006.01)
  *C02F 103/16* (2006.01)
(58) Field of Classification Search
  USPC .......................................................... 210/703
  See application file for complete search history.

(56) References Cited

U.S. PATENT DOCUMENTS

| | | | | |
|---|---|---|---|---|
| 6,818,609 B2 * | 11/2004 | Blithe | ................ | B21B 45/0242 |
| | | | | 134/40 |
| 7,018,959 B2 * | 3/2006 | McCullough | ........ | C10M 173/02 |
| | | | | 508/250 |
| 2004/0038846 A1 | 2/2004 | Blithe | | |

OTHER PUBLICATIONS

Written Opinion dated Apr. 30, 2015 in corresponding International Patent Application No. PCT/US2014/072470, filed Dec. 29, 2014.

* cited by examiner

Figure 4

DISSOLVED AIR FLOTATION USE WITH CATIONIC METAL PROCESSING FLUIDS

CROSS-REFERENCE TO RELATED APPLICATIONS

This application is a national stage of International Patent Application No. PCT/US2014/072470, filed Dec. 29, 2014, which claims the benefit of the priority of U.S. Provisional Patent Application No. 61/921,691, filed Dec. 30, 2013, which applications are incorporated herein by reference.

BACKGROUND

Different chemical compositions, and their corresponding emulsion systems, are used in metal deformation processes to provide a boundary layer which separates the metal work tool from the metal slabs being processed. Such compositions and emulsions facilitate the transport of water-insoluble materials contained therein to the metal work tool or metal slab in a uniform and consistent manner. The emulsion system provides cooling by evaporative water loss, heat removal from the system, through surface contact with the metal work tool and the metal slabs.

Many of the emulsions which are used for metal deformation processes are based upon anionic fatty acid chemistry, i.e., anionic chemistry, which provides effective lubrication properties for both the work equipment and the metal article being deformed. However, a number of problems are encountered when using the anionic chemistry emulsions. These problems include the formation of metallic soap particles which occur via reactions between the metal surfaces or dissolved multivalent ions and the fatty acid components utilized, emulsion stability issues when the emulsion systems become contaminated with metallic debris and fines, and issues with filtration processes employed to remove the metallic debris.

In order to correct the deficiencies with anionic chemistry emulsions, it is necessary to remove a portion of the fluid from the emulsion system used in the metal deformation process and replace it with a combination of fresh rolling oil and water. However, doing so is costly and which can negatively impact operations.

It was later determined that dissolved air floatation (DAF) could be applied to contaminated metal processing fluids. However, the electro-negative charge on the air bubble formed during DAF has a disruptive effect on anionic metal processing fluid emulsions, which operate at a pH of about 7.0 to about 8.2. In doing so, shifts in emulsion stability result and valuable chemical components are undesirably lost when the metal fines and debris are removed using DAF.

Similar problems arise when using cationic chemistry emulsions in metal deformation processes. Specifically, metal contaminants, i.e., metal fines, dirt, and debris are generated. Metal particles and debris naturally form during the metal deformation process, and are carried away from the metal deformation work area and equipment by the emulsion fluid. Some of the generated metallic debris and fines are small enough that they pass through the filter media used in mechanical filtration processes. Frequently, these fine metal particles and debris are difficult to remove from the contaminated metal processing fluid.

Filters may be utilized to remove some of these fine metal contaminants, but they typically do not perform efficiently and do not remove all of the contaminants. Furthermore, it is necessary to dispose of the contaminated filter paper, which is costly and environmentally unacceptable. If these fine metal contaminants are not removed and the metal processing fluid is re-used, the metal deformation process will eventually become inoperable, thereby requiring restarting the process with expensive and newly prepared metal processing fluid.

SUMMARY OF THE INVENTION

Described herein are processes for removing contaminants from contaminated, cationic-based metal processing fluids without upsetting the emulsion environment of metal processing fluid.

In one aspect, a process for cleaning a metal processing fluid which is substantially free of fatty acids is provided and includes treating the metal processing fluid with dissolved air floatation.

In another aspect, a process for deforming a metal is provided and includes (i) deforming a first metal with a new metal processing fluid which is substantially free of fatty acids to provide a used metal processing fluid; (ii) treating the used metal processing fluid with dissolved air floatation; and (iii) deforming a second metal with the metal processing fluid from step (ii).

In yet a further aspect, a process for removing suspended foreign matter from a contaminated metal processing fluid which is substantially free of fatty acids is provided and includes (a) providing the contaminated metal processing fluid into a tank; (b) introducing a portion of the contaminated metal processing fluid from step tank into a vessel, wherein the vessel is pressurized to saturate the metal processing fluid; (c) introducing the saturated metal processing fluid into the tank; (d) mixing the saturated metal processing fluid with the contaminated metal processing fluid in the tank; (e) permitting the pressure in the tank to lessen to permit the formation of bubbles in the tank, wherein the bubbles adhere to and carry the suspended foreign matter from the contaminated metal processing fluid to the upper layer of the contaminated metal processing fluid; and (f) removing the suspended foreign matter from the upper layer; wherein the process is performed without removing the emulsion of the metal processing fluid. In one embodiment, the process is performed in the absence of a filter. In another embodiment, the process is performed in the absence of a filter which is capable of removing suspended foreign material in the contaminated metal processing fluid.

In a further aspect, the processes described herein remove suspended foreign matter from the metal processing fluid. In one embodiment, the suspended foreign matter in the metal processing fluid cannot be removed using filtration.

In still another aspect, the processes described herein do not affect the balance of the chemicals in the metal processing fluid and/or emulsion.

In yet a further aspect, the processes described herein are performed in the absence of a flocculant.

In another aspect, the processes described herein are performed in the absence of centrifugation.

In a still a further aspect, the processes described herein are performed in the absence of foaming.

In yet another aspect, a device for removing suspended foreign matter from a contaminated metal processing fluid which is substantially free of fatty acids and lacks a filter is provided. The device includes (a) a tank including a first conduit attached through one end to the lower portion of the tank for providing the contaminated metal processing fluid into the tank; (b) a vessel attached to the other end of the conduit and containing a second conduit for introducing air into the vessel; (c) a third conduit for removing clarified metal processing fluid from the tank; and (d) a fourth conduit for removing the suspended foreign matter.

In a further aspect, an improved process for cleaning a metal processing fluid which is substantially free of fatty acids and suspended metal particles is provided, where the improvement includes performing the process using dissolved air floatation in the absence of filtration.

Other aspects and advantages of the invention will be readily apparent from the following detailed description of the invention.

DETAILED DESCRIPTION OF THE INVENTION

Dissolved air floatation (DAF) technology is utilized as a means to facilitate the separation of metallic fines and debris from metal processing fluids and emulsion systems. Specifically, DAF technology is utilized in conjunction with cationic metal processing fluids and emulsion systems to remove metal fines and debris from the metal processing fluids without upsetting or altering the chemical composition of the emulsion system.

Alternatively, the processes described herein are not limited to DAF. Other types of floatation may be utilized in clarifying the contaminated metal processing fluids. In one embodiment, another type of floatation includes induced air flotation such as that described in U.S. Pat. No. 2,578,040, which is incorporated herein by reference. In a further embodiment, another type of floatation includes froth flotation such as that described in U.S. Pat. Nos. 2,153,449; 2,335,209; 2,347,147; 2,352,365; 2,274,658; and 2,578,040, which are incorporated herein by reference.

In one embodiment, the composition of the cationic metal processing fluid emulsion is not upset or altered using DAF. In another embodiment, the cationic metal processing fluid emulsion remains stable and retains its chemical components, while the DAF process, at the same time, effectively removes the metallic debris. The retention of the chemical components, and the stabilized oil concentration of the metal processing fluid emulsion, provides a more consistent emulsion system which requires less make-up material to maintain the operational performance of the metal deformation process.

The processes described herein are applied to contaminated metal processing fluids and thereby result in clarified metal processing fluid having good lubrication properties. The processes effectively clean or clarify contaminated metal processing fluids. In addition, the clarified metal processing fluids produced herein don't have the negative attributes of clarified metal processing fluids which are based on anionic fatty acid technology. In one embodiment, these metal processing fluids clarified herein are substantially free of fatty acids. In another embodiment, the processes do not affect the balance of the chemicals in the metal processing fluid. In a further embodiment, the processes described herein are performed in the absence of a filter. In still another embodiment, the processes described herein are performed in the absence of a flocculent, i.e., a reagent which agglomerate foreign matter in a metal processing fluid. In a yet further embodiment, the processes described herein are performed in the absence of centrifugation. In another embodiment, the processes described herein are performed in the absence of foaming and the use of foaming techniques. In a further embodiment, the processes described herein are performed in the absence of frothing and/or frothing techniques. In still another embodiment, the processes described herein permit immediate re-use of the metal processing fluid emulsion without the need to utilize vigorous mixing techniques. In yet a further embodiment, the processes result in extending the working life of the metal processing fluid, thereby avoiding costly shutdown and maintenance requirements of the plant.

The phrase "fatty acid" as used herein refers to non-oleic acids. Similarly, the phrase "substantially free of fatty acids" as used herein is meant to describe a composition having less than about 2% by weight fatty acids in the concentrate. In one embodiment, the phrase "substantially free of fatty acids" describes a composition having about 0% to about 1.9% by weight fatty acids, i.e., about 0, 0.1, 0.2, 0.3, 0.4, 0.5, 0.6, 0.7, 0.8, 0.9, 1, 1.5, 1.6, 1.7, 1.8, 1.9 or fractions or ranges there between.

The phrases "metal deformation process" as used herein is meant to describe processes which are performed to a metal article to alter its state or shape. In one embodiment, the metal deformation processes include those processes where a metal surface or slab is deformed. Such processes can be performed at cold or hot temperature conditions and includes metal rolling, metal drawing, and metal forming operations. A number of types of process or press equipment known in the art can be utilized to deform metals and can be selected by those skilled in the art with regard to the metal being deformed and the product to be prepared therefrom.

Similarly, the phrase "metal processing fluid" as used herein is meant to describe fluids which are utilized to perform metal deformation. In one embodiment, the metal processing fluid includes metal removal fluids, metal forming fluids, metal treating fluids, metal protecting fluids, or combinations thereof.

The term "metal" as used herein is meant to describe metals that can be processed using deformation techniques known in the art and the methods and compositions described herein. Such "metals" include iron, aluminum, copper, magnesium, tin, and zinc. The term "metal" also includes alloys of the above-noted metals with other elements that produce a stable metal alloy. In one embodiment, the metal to be processed is in the form of a slab, sheet, rod, or any other form that may be processed using the metal deformation processes defined above.

The phrase "contaminated metal processing fluid" as used herein refers to a metal processing fluid prior to treatment with DAF as described herein. The contaminant in the metal processing fluid is any solid material generated during the metal deformation process. In one embodiment, the contaminant is suspended foreign matter. In a further embodiment, the contaminant is fine metal particles. In another embodiment, the contaminant cannot be removed using filtration. The phrase "clarified metal processing fluid" as used herein refers to a metal processing fluid after treatment with DAF as described herein. The phrase "uncontaminated metal processing fluid" as used herein refers to fresh metal processing fluid which has not been utilized in metal processing, i.e., is new or fresh.

It is to be noted that the term "a" or "an" refers to one or more. As such, the terms "a" (or "an"), "one or more," and "at least one" are used interchangeably herein.

The words "comprise", "comprises", and "comprising" are to be interpreted inclusively rather than exclusively. The words "consist", "consisting", and its variants, are to be interpreted exclusively, rather than inclusively. While various embodiments in the specification are presented using "comprising" language, under other circumstances, a related embodiment is also intended to be interpreted and described using "consisting of" or "consisting essentially of" language.

As used herein, the term "about" means a variability of 10% from the reference given, unless otherwise specified.

I. Cationic Metal Processing Fluid Concentrates

Cationic compositions provide excellent lubrication properties when utilized in the metal deformation applications of both non-ferrous and ferrous metal alloys. One beneficial aspect is their enhanced emulsion stability and consistency of performance over the anionic metal processing fluids. These cationic metal processing fluid compositions contain several components. These cationic metal processing fluid compositions are concentrates and can be used by the customer as such or diluted as described below.

(i) The Phosphonate Ester

In one embodiment, the metal processing fluids contain a phosphonate ester, a lubricating ester, an emulsifier, a dispersant, or a combination thereof. These compositions can also include an antioxidant; a corrosion inhibitor; and an optional solubilizing carrier or an alkaline compound.

In one embodiment, the metal processing fluids contain one or more phosphonate ester. In another embodiment, the phosphonate ester is an alkyl alkylphosphonate ester. As used herein, the phase "alkyl alkylphosphonate ester" describes a phosphorus compound of the formula.

In the formula above, $R^1$ is $C_2$ to $C_{20}$ alkyl, substituted $C_2$ to $C_{20}$ alkyl, $C_2$ to $C_{20}$ alkenyl, substituted $C_2$ to $C_{20}$ alkenyl, $C_2$ to $C_{20}$ alkynyl, substituted $C_2$ to $C_{20}$ alkynyl, $C_6$ to $C_{20}$ aryl, or $C_6$ to $C_{20}$ alkyl aryl. $R^2$ and $R^3$ are independently H, $C_1$ to $C_8$ alkyl, substituted $C_1$ to $C_8$ alkyl, $C_2$ to $C_8$ alkenyl, substituted $C_2$ to $C_8$ alkenyl, $C_2$ to $C_8$ alkynyl, substituted $C_2$ to $C_8$ alkynyl, $C_6$ to $C_{20}$ aryl, or $C_6$ to $C_{20}$ alkyl aryl. Tautomers or acceptable salts thereof of the above-noted formula can also be utilized.

The term "alkyl aryl" as used herein describes an aryl group which is substituted with one or more alkyl groups and where the point of attachment of the "alkyl aryl" group is though the aryl group.

The $R^1$, $R^2$, and $R^3$ substituents noted above can be the same or can be different. In one embodiment, $R^1$ is $C_{14}$ to $C_{18}$ alkyl and $R^2$ and $R^3$ are defined as noted above. In another embodiment, $R^2$ is H or $C_1$ to $C_4$ alkyl and $R^1$ and $R^3$ are defined as noted above. In a further embodiment, $R^3$ is H or $C_1$ to $C_4$ alkyl and $R^1$ and $R^2$ are defined as noted above. In yet another embodiment, $R^2$ and $R^3$ are the same. In still a further embodiment, $R^2$ and $R^3$ are hydrogen, methyl, ethyl, or butyl groups.

The compositions may contain about 0.5% to about 12% by weight, i.e., 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12 or integers, fractions, or ranges there between, of a phosphonate ester. In one embodiment, the composition contains about 2% to about 6% by weight of a phosphonate ester. In a further embodiment, the composition contains about 2% to about 4% by weight of a phosphonate ester. In another embodiment, the composition contains about 3% by weight of a phosphonate ester.

(ii) Lubricating Ester

To provide lubrication to the surface of the metal being deformed, as well as the process equipment, one or more of a lubricating agent, one or more of a lubricating ester, is included as a second component in the compositions. A variety of lubricating esters known in the art can be utilized and include, without limitation, polyol esters, trimer acid esters, or dimer acid esters. Suitable lubricating esters are commercially available from a number of manufacturers.

In one embodiment, the lubricating ester is a polyol ester. In another embodiment, the lubricating ester is a polyol ester which results from the reaction of a $C_7$ to $C_{20}$ fatty acid with a polyol alcohol. Polyol alcohols that can be utilized to form the polyol esters include, without limitation, pentaerythritol, trimethylolpropane, trimethylolethane, neopentylglycol, or neopentylglycol monohydroxy pivalate.

In another embodiment, the lubricating ester is a trimer or dimer acid ester of one or more of a monohydric alcohol. In certain compositions, the trimer acid ester is the product resulting from the esterification of a polymerized unsaturated $C_{12}$ to $C_{24}$ fatty acid with one or more of a monohydric alkoxylated alcohol. The monohydric alkoxylated alcohol can be, without limitation, a $C_1$ to $C_{24}$ aliphatic saturated alcohol alkoxylated with about 2 to about 25 moles of a $C_2$ to $C_5$ alkylene oxide, a $C_1$ to $C_4$ terminated alkoxy polyalkylene glycol alkoxylated with about 2 to about 25 moles of a $C_2$ to $C_5$ alkylene oxide, or a combination thereof. In other compositions, the trimer acid ester is formed from the esterification of a polymerized unsaturated $C_{12}$ to $C_{24}$ fatty acid with one or more of a monohydric alkoxylated alcohol as described above, and an aliphatic $C_1$ to $C_{24}$ monohydric alcohol.

In yet another embodiment, combinations of the above-noted lubricating esters can be utilized in the compositions.

The composition may contain about 4% to about 50% by weight, i.e., 4, 5, 10, 15, 20, 25, 30, 35, 40, 45, or 50 or integers, fractions, or ranges there between, of a lubricating ester or esters. In one embodiment, the composition contains about 10 to about 35% by weight of a lubricating ester or esters. In a further embodiment, the composition contains about 20 to about 30% by weight of a lubricating ester or esters. In another embodiment, the composition contains about 24% by weight of a lubricating ester or esters.

(iii) Emulsifier or Dispersant

An agent that provides stability to an emulsion or dispersion may also be included in the compositions. The agent may be an emulsfier or dispersant. In one embodiment, one or more of an emulsifier or dispersant is included in the compositions. In another embodiment, one or more of an emulsifier and one or more of a dispersant is included in the compositions.

A number of emulsifiers and dispersants are known in the art and are commercially available from numerous manufacturers. Such emulsifiers and dispersants include, without limitation, alkoxylated linear alcohols, alkoxylated secondary alcohols, alkoxylated alkylaryl alcohols, alkoxylated primary amines, alkoxylated amides, alkoxylated phosphate esters, alkoxylated acids, and sodium petroleum sulfonates, among others. In one embodiment, the emulsifier is an alkoxylated primary amine or sodium petroleum sulfonate.

The compositions may contain about 0.5% to about 15% by weight, i.e., 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, or 15 or fractions or ranges there between, of an emulsifier, dispersant, or combination thereof. In one embodiment, the composition contain about 0.5% to about 10% by weight of an emulsifier, dispersant, or combination thereof. In another embodiment, the composition contains about 0.5% to about 6% by weight of an emulsifier, dispersant, or combination thereof.

(iv) Antioxidant

The compositions may include as a further component one or more of an antioxidant which either retards or inhibits the oxidative deterioration of the compositions. A variety of suitable antioxidants is known in the art and commercially available from numerous manufacturers. Such antioxidants include, without limitation, butylated hydroxytoluene, butylated hydroxyanisole, phosphites, phenolic antioxidants, and amine antioxidants, among others. In one embodiment, the antioxidant is butylated hydroxytoluene, butylated hydroxyanisole, or phosphites. In another embodiment, the antioxidant is butylated hydroxytoluene.

The composition may contain about 0.1% to about 1% by weight, i.e., about 0.1, 0.2, 0.3, 0.4, 0.5, 0.6, 0.7, 0.8, 0.9, 1% or fractions or ranges there between, of an antioxidant. In one embodiment, the composition contains about 0.4% by weight of an antioxidant (v) Corrosion Inhibitor One or more of a corrosion inhibitor, which prevents the corrosion of the process or press equipment, is optionally included as another component of the compositions. A number of corrosion inhibitors are known in the art and are commercially available from numerous manufacturers. Such corrosion inhibitors include benzotriazole, tolyltriazole, and petroleum sulfonates. In one embodiment, the corrosion inhibitor is tolyltriazole or petroleum sulfonates.

The compositions may contain about 0.1% to about 5% by weight, i.e., about 0.1, 0.5, 1, 1.5, 2, 2.5, 3, 3.5, 4, 4.5, or 6 or fractions or ranges there between, of a corrosion inhibitor. In one embodiment, a composition contains about 1% by weight of a corrosion inhibitor.

(vi) Carrier

The compositions optionally include a solubilizing carrier which solubilizes one or more components of the compositions. In one embodiment, the carrier is a reagent which does not react with the components of the compositions. In another embodiment, the carrier has a viscosity of about 50 to about 3000, i.e., 50, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000 or integers, fractions or ranges there between, Saybolt Universal Seconds at 100° F.

A variety of carriers is known in the art and commercially available from numerous manufacturers. Such carriers can be used in the compositions and include hydrocarbon oils, esters, and lubricating esters, among others. The hydrocarbon oil can be a mineral oil, naphthenic hydrocarbon oil, paraffinic hydrocarbon oil, poly α-olefin, alkylbenzene, polyisobutylene, and polypropylene.

The composition may contain at least about 50% by weight, i.e., at least about 50, 55, 60, 65, 70, 65, 70, 75, 80, 85, 90, 95% or integers, fractions or ranges there between, of a solubilizing carrier. In one embodiment, a composition contains about 50% to about 85% by weight of a carrier.

(vii) Alkaline Compound

The compositions optionally include one or more of an alkaline compound. The phrase "alkaline compound" is meant to describe any chemical compound that when used in the composition maintains a pH of about 6.0 to about 6.5, i.e., about 6.0, 6.1, 6.2, 6.3, 6.4, 6.5, or fractions or ranges there between. The alkaline compound can also provide biostability to the compositions.

A number of alkaline compounds are known in the art and are commercially available from numerous manufacturers. Such alkaline compounds include, without limitation, alkanolamines, alkali hydroxides, alkylamines, and N-alkylalkanol amines, among others. In one embodiment, the alkanolamine is monoethanolamine, triethanolamine, aminomethyl propanol, monoisopropanol amine, triisopropanol amine, or diglycolamine. In another embodiment, the hydroxide reagent is sodium hydroxide or potassium hydroxide. In a further embodiment, the alkylamine is $C_{12}$ to $C_{14}$ t-alkylamine The composition contains about 0.1% to about 1% by weight, i.e., about 0.1, 0.2, 0.3, 0.4, 0.5, 0.6, 0.7, 0.8, 0.9, 1 or fractions or ranges there between, of the alkaline compound.

(viii) Other Reagents

Other optional reagents which do not affect the properties of, or react with, the above-listed components of the metal processing fluids can be added thereto. Such optional reagents include surfactants, coupling agents, anti-wear additives, thickening or bodying agents, antifoam agents, detergents, pour point depressors, viscosity index improvers, coloring agents, fungicides, biostability agents, anti-rust agents, and combinations thereof. See, Mortier et al., "Chemistry and Technology of Lubricants", VCH Publisher, Inc., 1992, which is hereby incorporated by reference.

(ix) Examples of Metal Processing Fluids

In one embodiment, a metal processing fluid is provided which contains about 0.5% to about 12% by weight of a phosphonate ester; about 4% to about 50% by weight of a lubricating ester; about 0.5% to about 15% by weight of an emulsifier, dispersant, or combination thereof; about 0.1% to about 1% by weight of an antioxidant; and about 0.1% to about 5% by weight of a corrosion inhibitor.

In another embodiment, a metal processing fluid is provided which is substantially free of fatty acids and contains about 0.5% to about 12% by weight of a phosphonate ester; about 4% to about 50% by weight of a lubricating ester; about 0.5% to about 15% by weight of an emulsifier, dispersant, or combination thereof; about 0.1% to about 1% by weight of an antioxidant; and about 0.1% to about 5% by weight of a corrosion inhibitor.

In a further embodiment, a metal processing fluid is provided which is substantially free of fatty acids and contains about 0.5% to about 12% by weight of a phosphonate ester; about 4% to about 50% by weight of a lubricating ester; about 0.5% to about 15% by weight of an emulsifier, dispersant, or combination thereof; about 0.1% to about 1% by weight of an antioxidant; about 0.1% to about 5% by weight of a corrosion inhibitor; and at least 50% by weight of a solubilizing carrier.

In yet another embodiment, a metal processing fluid is provided which contains about 1% to about 10% by weight of a phosphonate ester; about 4% to about 50% by weight of a lubricating ester; about 1% to about 15% by weight of an emulsifier, dispersant, or combination thereof; about 0.1% to about 5% by weight of an alkaline compound; and about 50% to about 85% by weight of a solubilizing carrier.

In a further embodiment, a metal processing fluid is provided which contains about 0.5% to about 12% by weight of a phosphonate ester; about 4% to about 80% by weight of a lubricating ester; about 0.5% to about 15% by weight of an emulsifier, dispersant, or combination thereof; about 0.1% to about 1% by weight of an antioxidant; about 0.1% to about 5% by weight of a corrosion inhibitor; and at least 50% by weight of a solubilizing carrier.

In another embodiment, a metal processing fluid is provided which contains about 1% to about 10% by weight of a phosphonate ester; about 4% to about 25% by weight of a trimer acid ester of a methoxypolyethylene glycol monohydric alcohol having an average molecular weight of about 350, a $C_1$ to $C_9$ aliphatic monohydric alcohol, or combinations thereof; about 1% to about 15% by weight of an emulsifier, dispersant, or combination thereof; about 0.1% to about 5% by weight of an alkaline compound; about 0.1% to about 1% by weight of an antioxidant; about 0.1% to about 5% by weight of a corrosion inhibitor; and about 50% to about 85% by weight of a hydrocarbon oil.

In yet a further embodiment, a metal processing fluid is provided which contains about 1% to about 10% by weight of a phosphonate ester; about 4% to about 25% by weight of a trimer acid ester of a methoxypolyethylene glycol monohydric alcohol having an average molecular weight of about 350, a $C_1$ to $C_9$ aliphatic monohydric alcohol, or combinations thereof; about 1% to about 15% by weight of an emulsifier, dispersant, or combination thereof; about 4% to about 20% by weight of a polyol ester of a $C_{12}$ to $C_{20}$ fatty acid; about 0.1% to about 1% by weight of an antioxidant; about 0.1% to about 5% by weight of a corrosion inhibitor; about 0.1% to about 5% by weight of an alkaline compound; and about 50% to about 85% by weight of a hydrocarbon oil.

In still another embodiment, the metal processing fluid is the fluid described in U.S. Pat. No. 6,818,609, which is incorporated by reference herein.

II. Metal Processing Fluid Emulsions

Also provided are metal processing fluid emulsions which have desirable lubricating properties, but do not generate metallic soap particles during the metal deformation process. One of skill in the art would be able to generate the emulsions described herein using skill in the art and the teachings of the instant specification. In one embodiment, oil-in-water emulsions can be prepared as described herein.

The term "emulsion" as used herein is meant to describe a solution containing a heterogeneous mixture of two or more immiscible liquids where one liquid forms minute droplets which are suspended in the other liquid(s), i.e., an oil-in-water solution. In one embodiment, the particles of the emulsion are about 1,000 Å to about 500,000 Å. In another embodiment, the particles of the emulsion are about 5,000 Å to about 100,000 Å. In a further embodiment, the particles of the emulsion are about 5,000 Å to about 50,000 Å. In still another embodiment, the particles of the emulsion are about 20,000 Å to about 200,000 Å. A macro emulsion can be formed where the size of the minute droplet is about 5,000 Å (0.5μ) to about 100,000 Å (10μ). For non-ferrous metal deformation processes the size of the minute droplet may be about 5,000 Å (0.5μ) to about 50,000 Å (5μ). For ferrous metal deformation processes, the size of the minute droplet may be about 20,000 Å (2μ) to about 200,000 Å (20μ).

The phrase "oil-in-water emulsion" as used herein is meant to describe an emulsion having oil soluble and aqueous soluble components. The phrase "oil-in-water emulsion" can also describe an emulsion having an oil phase and a water phase, where the oil and water phases are thoroughly combined to form a meta-stable system where the water is the continuous phase. The cationic oil-in-water emulsions include about 1% to about 20% by weight of an oil phase and about 80% to about 99% by weight of an aqueous phase. In one embodiment, the oil-in-water emulsions include about 2% to about 10% by weight of an oil phase. In a further embodiment, the oil-in-water emulsions include about 4% to about 8% by weight of an oil phase.

The oil-in-water emulsions are prepared by combining water, a lubrication agent, and a solubilizing carrier. In one embodiment, the oil-in-water emulsions are prepared by diluting a metal processing fluid as described above with water.

In one embodiment, an oil-in-water emulsion includes about 1% to about 20% by weight of an oil phase which contains about 0.5% to about 20% by weight of lubrication components, at least 50% by weight of a solubilizing carrier, and an emulsifier package designed to provide a stable emulsion system having a pH between 5.8 and 6.7; and about 80% to about 99% by weight water.

In another embodiment, an oil-in-water emulsion includes about 1% to about 20% by weight of an oil phase which contains about 10% to about 50% by weight of lubrication components, an emulsifier package designed to provide a stable emulsion system having a pH between 5.8 and 6.7, with the balance being a solubilizing carrier; and about 80% to about 99% by weight water.

In a further embodiment, an oil-in-water emulsion includes (a) about 1% to about 20% by weight of an oil phase, comprising (i) about 0.5% to about 12% by weight of a phosphonate ester and (ii) at least 50% by weight of a solubilizing carrier; and (b) about 80% to about 99% by weight water.

In yet another embodiment, an oil-in-water emulsion includes (a) about 1% to about 20% by weight of an oil phase, comprising (i) about 1% to about 10% by weight of a phosphonate ester, (ii) about 1% to about 15% by weight of an emulsifier, dispersant, or combination thereof, (iii) about 4% to about 50% by weight of a lubricating ester, (iv) about 50% to about 85% by weight of a carrier and (v) about 0.1% to about 5% by weight of an alkaline compound; (b) about 80% to about 99% by weight water.

In still a further embodiment, an oil-in-water emulsion includes (a) about 1% to about 20% by weight of an oil phase, comprising (i) about 1 to about 10% by weight of a phosphonate ester, (ii) about 4 to about 25% by weight of a trimer acid ester of a methoxypolyethylene glycol monohydric alcohol having an average molecular weight of about 350, a $C_1$ to $C_9$ aliphatic monohydric alcohol, or combinations thereof, (iii) about 1% to about 15% by weight of an emulsifier, dispersant, or combination thereof; (iv) about 0.1% to about 1% by weight of an antioxidant, (v) about 0.1% to about 5% by weight of a corrosion inhibitor; (vi) about 50% to about 85% by weight of a hydrocarbon oil, and (vii) about 0.1% to about 5% by weight of an alkaline compound; (b) about 80% to about 99% by weight water.

In another embodiment, an oil-in-water emulsion includes (a) about 1% to about 20% by weight of an oil phase, comprising (i) about 1% to about 10% by weight of a phosphonate ester; (ii) about 4% to about 25% by weight of a trimer acid ester of a methoxypolyethylene glycol monohydric alcohol having an average molecular weight of about 350, a $C_1$ to $C_9$ aliphatic monohydric alcohol, or combinations thereof; (iii) about 4% to about 20% by weight of a polyol ester of a $C_7$ to $C_{20}$ fatty acid; (iv) about 1% to about 15% by weight of an emulsifier, dispersant, or combination thereof; (v) about 0.1% to about 5% by weight of a corrosion inhibitor; (vi) about 0.1% to about 1% by weight of an antioxidant; (vii) about 50% to about 85% by weight of a hydrocarbon oil; and (viii) about 0.1% to about 5% by weight of an alkaline compound; and (b) about 80% to about 99% by weight water.

In yet a further embodiment, the oil-in-water fluid includes the emulsion described in U.S. Pat. No. 6,818,609, which is incorporated by reference herein.

III. Methods of Deforming Metals

The compositions and/or emulsions can be applied to the process equipment and/or metal slabs using techniques known by those of skill in the art and include spraying, coating, flooding, and brushing. The compositions or emulsions may be applied such that a thin layer of the composition or emulsion is present on the surface. The amount of composition or emulsion applied to the process equipment or metal slab can be increased or decreased as determined by one skilled in the art. A number of factors can influence the amount of composition or emulsion applied to the metal slab or process equipment and include, without limitation, temperature, pressure, property of the metal, type of process, and/or property of the desired deformed metal.

In one embodiment, the compositions or emulsions are applied to both the process equipment and metal slab to be deformed. In another embodiment, the compositions or emulsions can be applied to only the metal slab or process equipment as determined by one skilled in the art.

In one embodiment, a method of deforming a metal is provided which includes applying to the metal or equipment a composition described herein and deforming the metal.

In another embodiment, a method of deforming a metal is provided which includes applying to the metal or equipment an emulsion described herein and deforming the metal.

In yet another embodiment, a method of deforming a metal is provided which includes applying to the metal or process equipment, a composition described herein and deforming the metal.

In a further embodiment, a method of deforming a metal is provided which includes applying to the metal or process equipment, an emulsion described herein and deforming the metal.

In still another embodiment, a process for deforming a metal is provided and includes (i) deforming a first metal with a new metal processing fluid which is substantially free of fatty acids to provide a used metal processing fluid, (ii) treating the used metal processing fluid with dissolved air floatation; and (iii) deforming a second metal with the metal processing fluid from step (ii).

IV. Processes of Using DAF

The phrase "dissolved air floatation" as used herein refers to the process of dissolving air in contaminated and/or uncontaminated metal processing fluid to provide a pressured saturated dissolved air solution. Simply stated, DAF entails using pressurized metal processing fluid to remove contaminants from unpressurized metal processing fluid.

Dissolved air floatation equipment is known in the art. Examples of such equipment includes, without limitation, those sold by Komline-Sanderson Company of Peapack, N.J. and those described in U.S. Pat. No. 4,492,636, which is incorporated by reference.

Figure 1:
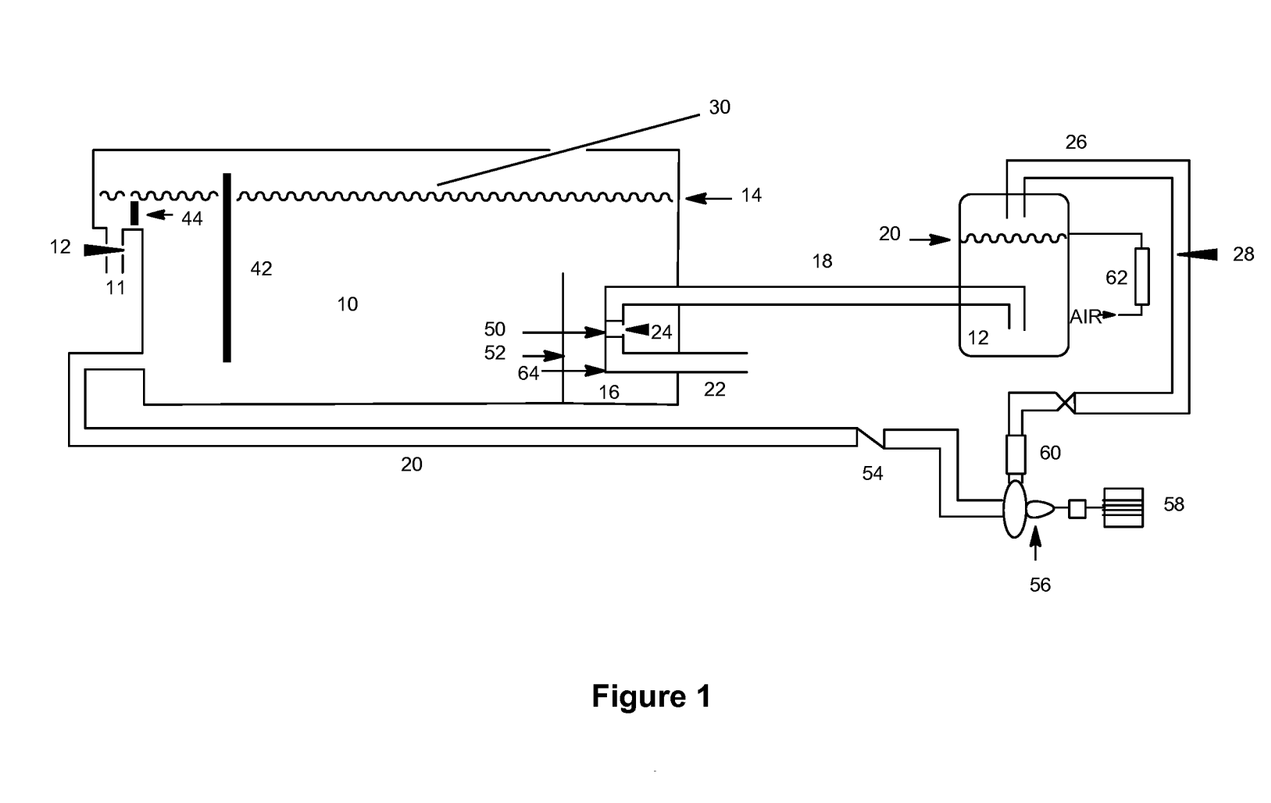
FIG. 1 is a side elevation view of a dissolved air floatation device.

The unpressurized contaminated metal processing fluid 14 is continuously fed into a tank 10. In one embodiment, the tank is round, rectangular, or another shaped selected by one skilled in the art. Tank 10 is connected through conduit 18 to vessel 12. In one embodiment, tank 10 includes reservoir 16, i.e., a mixing zone, at the lower portion or region of tank 10. Reservoir 16 is adjacent the inlets by means of baffle plate 52. Reservoir 16 is adjacent conduit 18, thereby permitting unpressurized contaminated metal processing fluid 14 to flow into vessel 12 through conduit 64. In one embodiment, the contaminated metal processing fluid flows continuously into tank 10. The tank containing the contaminated metal processing fluid is adapted to enable the continuous flow of the metal processing fluid there through. In one embodiment, contaminated metal processing fluid is added to tank 10 through conduit 22. Conduit 22 is connected to conduit 18.

The pressured metal processing fluid is formed by pressurizing vessel 18 containing the metal processing fluid using at least one gas. In one embodiment, the saturated dissolved air solution is prepared from an uncontaminated portion of the metal processing fluid being cleaned. In another embodiment, the saturated dissolved air solution is prepared from the contaminated metal processing fluid 14 or a portion thereof. In yet a further embodiment, the saturated dissolved air solution is prepared using water. In still another embodiment, the dissolved air solution is prepared using another fluid which is compatible with the metal processing fluid and does not interfere with the quality and stability thereof. In a further embodiment, the saturated dissolved air solution is obtained by first portioning off some of the uncontaminated metal processing fluid to a pressure vessel at some suitable location in the recycling process, and then introducing pressurized air into the uncontaminated metal processing fluid in the pressure vessel until it becomes saturated and then conveying the resultant saturated dissolved air solution under pressure into the lower portion of a tank containing the contaminated metal processing fluid as previously described.

Although dissolved air floatation is performed using air, DAF may be performed using other gases including, without limitation, nitrogen, argon, ozone, and/or carbon dioxide. These gases may be utilized alone or in combination with air. By doing so, the gas "dissolves" in the metal processing solution.

The vessel is pressurized by flowing gas through conduit 26. In one embodiment, the flowing gas is sprayed into the space above the upper surface of the metal processing fluid in vessel 12. The pressure sustained upon the saturated dissolved air solution should be sufficient to ensure that the gas remains dissolved and does not form into bubbles in the vessel. The pressure is optionally regulated by use of flow meter 62. In one embodiment, the pressure in the vessel is at least about 30 psig. In another embodiment, the pressure in the vessel is about 40 to about 100 psig, i.e., 40, 50, 60, 70, 80, 90, 100 or integers, fractions, or ranges there between. In a further embodiment, the pressure in the vessel is about 40 to about 70 psig.

The amount of contaminated metal processing fluid which must be pressurized may be selected by one skilled in the art. The selection of which depends on the amount of contaminants present in the fluid, components present in the metal processing fluid, conditions of the metal processing process, scale of the metal processing process, equipment utilized in the process, temperature of the fluid, viscosity of the fluid, specific gravity of the particles to be removed, among others. In one embodiment, about 10%, i.e., about 15, 20, 25, 30, 35, 40, 45, 50, 55, 60, 65, 70, 75, 80, 85, 90, or 95% or fractions, integers, or ranges there between, of the contaminated metal processing fluid is pressurized. In another embodiment, the contaminated metal processing fluid is retained in vessel 14 for at least about 2 min. In a further embodiment, the contaminated metal processing fluid is mixed in vessel 14 for a sufficient time to permit effective air or gas saturation in the vessel, as known to those skilled in the art. Optionally, vessel 22 contains a float control 28 which maintains a desired level of the contaminated metal processing fluid within vessel 22. Conduit 21 also is capable of rising vertically within vessel 22 to enable the metal processing fluid to be sprayed into the space above the upper surface of the metal processing fluid in vessel 22.

The pressurized saturated metal processing fluid 20 is then returned to tank 10 through conduit 18 into reservoir 16.

Pressurized, saturated metal processing solution is then mixed with the contaminated metal processing fluid. In one embodiment, the mixing is performed quiescently, i.e., slowly. In a further embodiment, the mixing is performed at a velocity of about 10 ft/sec, i.e., 10, 9, 8, 7, 6, 5, 4, 3, 2, 1 or fractions or ranges there between, or less. In another embodiment, the mixing is performed at a rate which does not initiate nucleation of the dissolved gas. In a further embodiment, the mixing is performed before the gas within the saturated solution 20 is able to nucleate and form bubbles.

Bubbles then form in the reservoir 16 and begin to rise in fluid 10. The "bubble" acts as a collection mechanism for the metal fines, allowing the metallic debris to float to the surface of the emulsion. In one embodiment, the formed bubbles are less than about 1000μ. In another embodiment, the bubbles are less than about 60μ. In a further embodiment, the bubbles are about 60 to about 1000μ.

The bubble has a slight electro-negative charge. Since the compositions described herein have a cationic charge, it was expected that the use of DAF on cationic based metal processing fluid emulsions would destroy the properties of the emulsion. However, the properties of the cationic metal processing fluid emulsions remained intact even after clarification by air floatation.

Specifically, the rising of the bubble push the contaminants/suspended foreign matter in the fluid 14 to the top of the tank 10. These contaminants may be removed by skill in the art using standard techniques. In one embodiment, the contaminants are removed using skimmer 30. In one embodiment, the skimmer 30 is an adjustable conveyer. In another embodiment, only an upper portion of the contaminated metal working fluid being clarified is removed.

Figure 2:
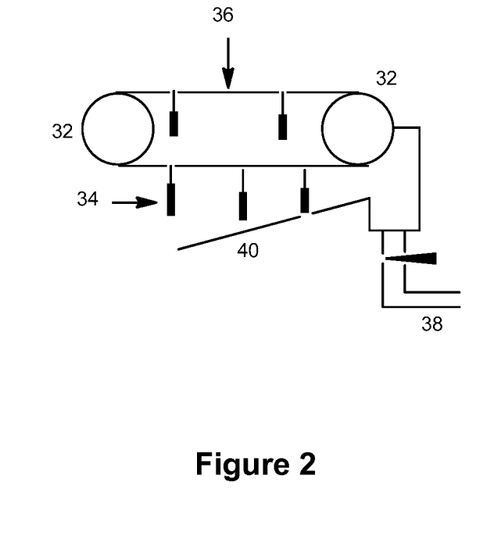
FIG. 2 is a side elevation view of a skimming device optionally for use in the dissolved air floatation device.
Figure 3:
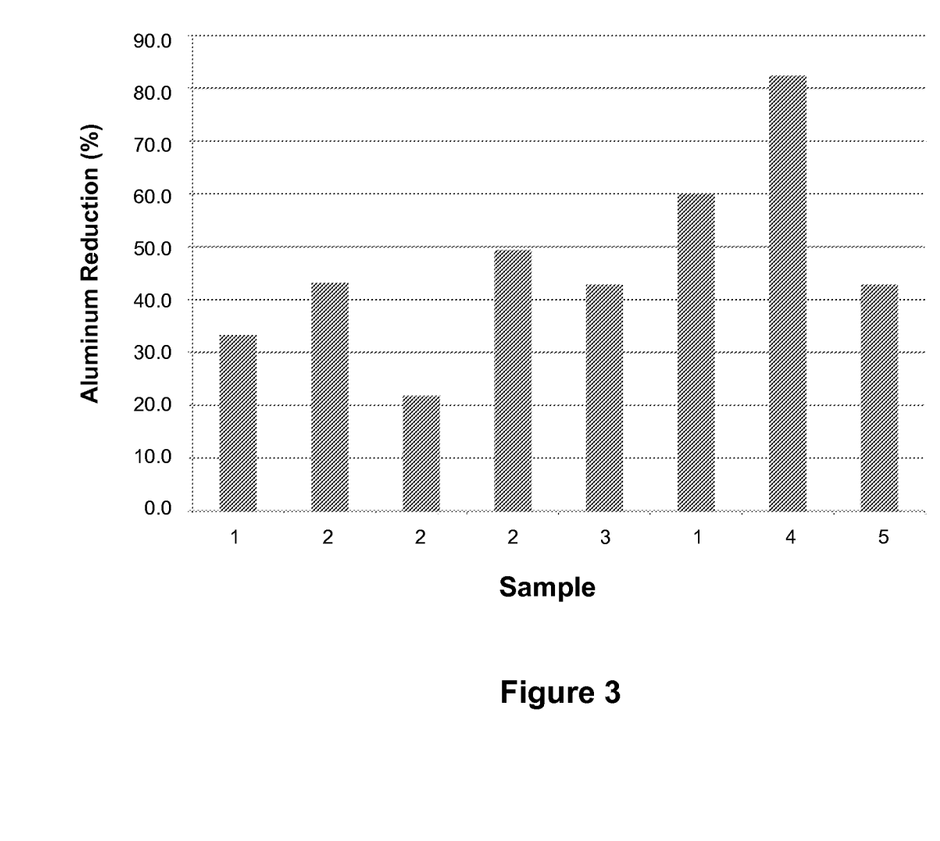
FIG. 3 is a bar graph of the amount of aluminum reduction (%) of contaminated metal processing fluids treated using the processes described herein.
Figure 4:
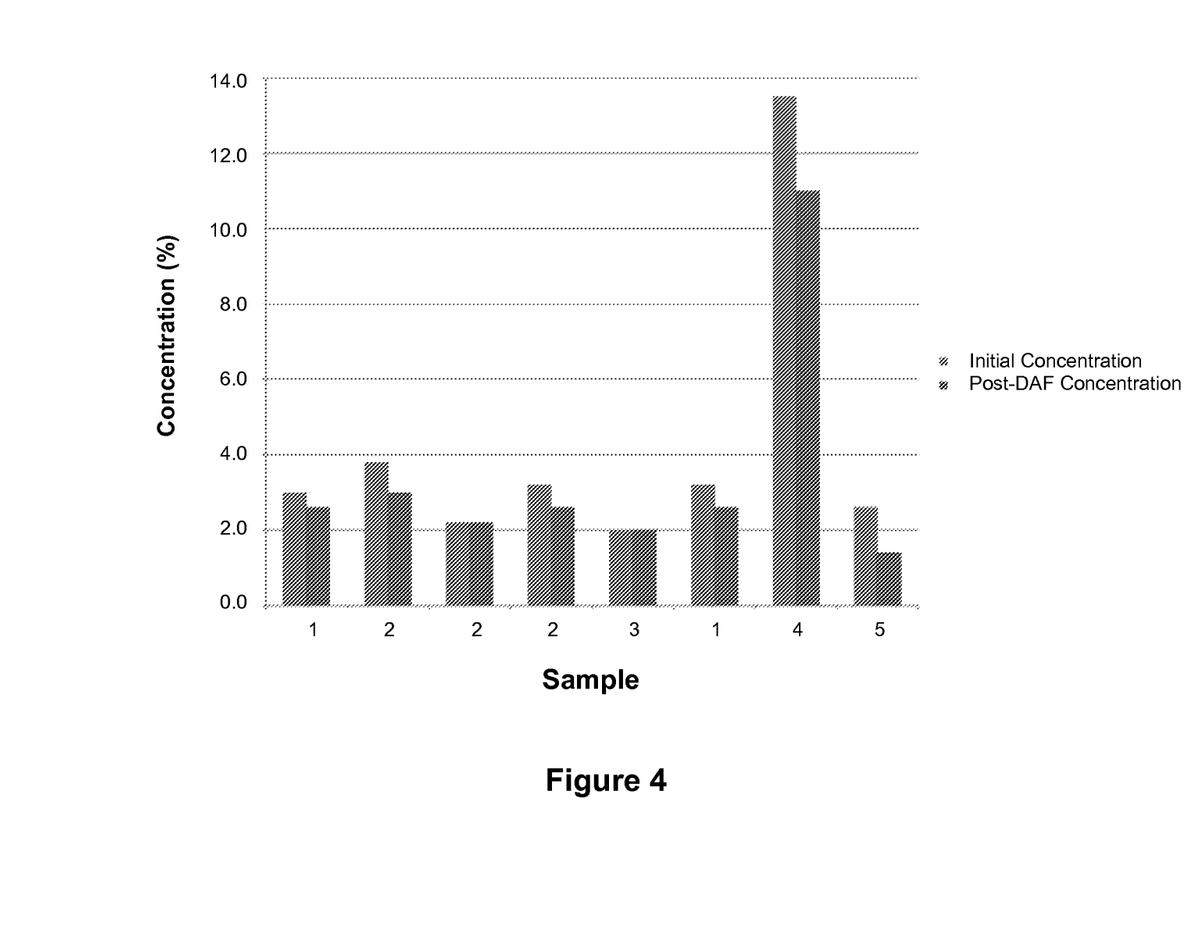
FIG. 4 is a bar graph of the concentration of two (2) components of the contaminated metal processing fluids before and after treatment with dissolved air floatation as described herein.

One of skill in the art would readily be able to select a suitable skimmer for use in the processes/devices described herein. In one embodiment, the penetration depth of the skimmer can be left unattended for long periods of time. In another embodiment, the skimmer contains the components of FIG. 2. In this skimmer, rotating drums 32 drive the skimming device 36. Connected to skimming device at varying intervals are blades 34 which can be adjusted to skim contaminants from the top of tank 10 to a beach 40. Beach 40 is directly adjacent to discharge conduit 38 for removal of the contaminants. In one embodiment, the direction of skimming is in a direction opposite to the flow of the metal processing fluid through tank 10. In a further embodiment, the depth of the blades of the skimmer in the contaminant layer is adjusted using skill in the art. In yet a further embodiment, the speed at which the blades traverse across the contaminant layer is adjusted using skill in the art. In another embodiment, beach 19 is located at the same end and above the location at which the contaminated metal processing fluid enters tank 10.

This clarified metal processing fluid may then be collected and thereby utilized in new or existing processes for processing metals. In one embodiment, tank 10 contains an outlet in the lower region of the tank 10, at the opposite end of the inlet, so that clarified metal processing fluid is required to flow across the length of tank 10 to exit. In a further embodiment, clarified metal processing fluid exits tank 10 through conduit 20. In another embodiment, the clarified metal processing fluid exits tank 10 through conduit 11. In a further embodiment, a pump 48 pumps the clarified metal processing fluid out of tank 10. Conduit 11 optionally contains a valve for regulating the release of the clarified metal processing fluid. Tank 10 optionally contains check valve 54, pump 56 driven by motor 58 through flow meter 60 into pipe 26.

The system as described above may contain other optional components which assist in the collection of clarified metal processing fluid. See, FIG. 1. In one embodiment, the tank includes a weir plate 42 near the outlet which directs the flow of clarified metal processing fluid out of conduit 11. Prior to exiting conduit 11, baffle 44 is optionally positioned adjacent thereto. In one embodiment, the baffle 44 is an adjustable liquid level baffle.

In order to control the flow of the contaminated metal processing fluid into vessel 14 or saturated dissolved air solution into tank 10, conduit 18 is optionally connected to conduit 22 through conduit 50 which contains valve 24. Conduit 50 is located adjacent and above conduit 64 for the unpressurized contaminated metal processing fluid. In one embodiment, conduit 50 is a diaphragm type valve which may be adjusted by from the exterior of tank 10. Valve 24 permits the operator to adjust the flow of unpressurized contaminated metal processing fluid 14 or pressurized contaminated metal processing fluid 20 into the tank. In one embodiment, valve 24 is controlled by suitable means from a location outside of the tank. In another embodiment, valve 24 prevents the formation of air bubbles before the saturated metal processing fluid mixes thoroughly with the contaminated metal processing fluid. In a further embodiment, valve 24 is an air actuated elastomeric diaphragm type valve. In yet another embodiment, valve 24 is a gate, ball, or plug.

Tank 10 may also include a means for removing solid matter settled on the bottom of the tank. In one embodiment, tank 10 includes a conveyor scraper at the bottom.

In one embodiment, a process for removing suspended foreign matter from a contaminated metal processing fluid which is substantially free of fatty acids is provided. The process includes providing the contaminated metal processing fluid into a tank. A portion of the contaminated metal processing fluid from the tank is introduced into a vessel, wherein the vessel is pressurized to saturate the metal processing fluid. The saturated metal processing fluid is introduced into the tank. The saturated metal processing fluid is mixed with the contaminated metal processing fluid in the tank. The pressure in the tank is permitted to lessen to permit the formation of bubbles in the tank, wherein the bubbles adhere to and carry the suspended foreign matter from the contaminated metal processing fluid to the upper layer of the contaminated metal processing fluid. Finally, the suspended foreign matter is removed from the upper layer. The process is performed without removing the emulsion of the metal processing fluid.

In another embodiment, a device for removing suspended foreign matter from contaminated metal processing fluid which is substantially free of fatty acids is provided. The device includes a tank which includes a first conduit attached through one end to the lower portion of the tank for providing the contaminated metal processing fluid into the tank. A vessel is attached to the other end of the first conduit and includes a second conduit for introducing air into the vessel. The device also includes a third conduit for removing clarified metal processing fluid from the tank and a fourth conduit for removing the suspended foreign matter. The device is constructed so as to lack a filter. The fourth conduit is optionally attached to the tank via a skimmer.

In a further embodiment, an improved process for cleaning a metal processing fluid which is substantially free of fatty acids and suspended metal particles is provided. The improvement includes performing the process using dissolved air floatation in the absence of filtration.

Unless defined otherwise in this specification, technical and scientific terms used herein have the same meaning as commonly understood by one of ordinary skill in the art and by reference to published texts, which provide one skilled in the art with a general guide to many of the terms used in the present application.

The following examples are illustrative only and are not intended to limit the present invention.

EXAMPLES

Example 1

Ten gallons of the contaminated metal processing fluid was added to a 15 gallon test tank of a lab-scale dissolved air floatation device. The contaminated fluid was processed at a rate of 1 gallon/minute through the system for a total of 20 hours. During the test, the fluid was pumped from the test tank into a pressure chamber, through a needle valve, and back into the test tank. The pressure vessel was pressurized to 80 psig with compressed air. The internal volume of the pressure vessel was 4 gallons and the volume of liquid in the vessel was controlled to remain at 2 gallons with a float switch. With a flow rate of 1 gallon/minute and controlled liquid volume of 2 gallons, the fluid retention time at 80 psig was for 2 minutes before the fluid depressurized as it passed through the needle valve and back to atmospheric pressure as it entered the sample tank. As the fluid was depressurized, the dissolved air came out of solution in the form of tiny air bubbles that grew and then rose to the surface of the fluid in the test tank, thus causing a layer of foam of ¼ inch to 1 inch thick to form on the surface. At intervals of one time/hour over the course of the 20 hours, the top of the foam layer was skimmed off and removed from the system.

Table 1 provides the components and amounts of the samples tested in the present example. Samples 1-4 represent cationic metal processing fluids and sample 5 represents an anionic metal processing fluid, all samples of which are then diluted with water to form the emulsion at the noted oil concentration i.e., 2 or 5% oil concentration. The emulsions were then processed as described herein.

TABLE 1

| Component | Sample Amount (%) | | | | |
|---|---|---|---|---|---|
| | 1 | 2 | 3 | 4 | 5 |
| naphthenic mineral oil | 71.49 | 56.52 | 68.29 | 0 | 79.10 |
| paraffinic mineral oil | 0 | 0 | 0 | 75.17 | 0 |
| polyol ester[1] | 18.00 | 35.00 | 18.00 | 10.00 | 0 |
| corrosion inhibitor[2] | 2.30 | 1.98 | 2.30 | 2.30 | 0 |
| antioxidant | 0.40[3] | 0.40[3] | 0.60[4] | 0.40[4] | 0.20[4] |
| phosphonate ester | 0.50 | 0.50 | 0.50 | 1.00 | 0 |
| emulsifier[5] | 5.26 | 3.55 | 8.26 | 6.50 | 0 |
| ricinoleic acid | 2.00 | 2.00 | 2.00 | 2.00 | 0 |

TABLE 1-continued

| Component | Sample Amount (%) | | | | |
|---|---|---|---|---|---|
| | 1 | 2 | 3 | 4 | 5 |
| aminomethyl propanol | 0.05 | 0.05 | 0.05 | 0 | 0 |
| coupler[6] | 0 | 0 | 0 | 2.13 | 0 |
| trimer acid ester | 0 | 0 | 0 | 0 | 4.00 |
| glycerol ester | 0 | 0 | 0 | 0 | 8.00 |
| alkyl phosphate ester | 0 | 0 | 0 | 0 | 3.00 |
| oleic acid | 0 | 0 | 0 | 0 | 3.50 |
| triethanolamine | 0 | 0 | 0 | 0 | 0.80 |
| butylethanolamine | 0 | 0 | 0 | 0 | 0.50 |
| biocide | 0 | 0 | 0 | 0.50 | 0.90 |
| pH | 6.7 at 5% oil conc. | 6.6 at 5% oil conc. | 6.1 at 2% oil conc. | 6.2 at 5% oil conc. | 8.3 at 5% oil conc. |

[1]pentaerythritol tetraoleate and neopentylglycol dioleate
[2]tolyltriazole and sodium petroleum sulfonate
[3]butylated hydroxytoluene
[4]butylated hydroxytoluene derivative
[5]ethoxylated tallow amine, oleyl alcohol ethoxylate, and oleyl alcohol ether carboxylate
[6]propylene glycol, dipropylene glycol, tetrahydroxypropylethylenediamine Prior to the test, a portion of the contaminated metal processing fluid was retained as the control. At the completion of 20 hours, a portion of clarified metal processing fluid in the tank was removed via a valve at the very bottom of the tank to be used as the post-DAF sample.

Table 2 provides the reduction of aluminum contaminants and change in concentration present in clarified metal processing fluid after DAF.

TABLE 2

| Sample | Al initial (mg/L) | Al final (mg/L) | Al reduction (%) | Initial conc. (%) | Final conc. (%) | Conc. change (%) |
|---|---|---|---|---|---|---|
| 1 | 6 | 4 | 33.3 | 3 | 2.6 | 0.4 |
| 2 | 74 | 42 | 43.2 | 3.8 | 3 | 0.8 |
| 2 | 46 | 36 | 21.7 | 2.2 | 2.2 | 0 |
| 2 | 75 | 38 | 49.3 | 3.2 | 2.6 | 0.6 |
| 3 | 42 | 24 | 42.9 | 2 | 2 | 0 |
| 1 | 10 | 4 | 60.0 | 3.2 | 2.6 | 0.6 |
| 4 | 28 | 16 | 42.9 | 2.6 | 1.4 | 1.2 |
| 5 | 59,568 | 10,518 | 82.3 | 13.5 | 11 | 2.5 |

These results unexpectedly illustrate that DAF applied to cationic metal processing fluid emulsions is successful in removing the metal fine debris, while simultaneously remaining the emulsion properties of the metal processing fluid. These results also surprisingly illustrate that DAF on cationic metal processing fluid emulsions outperforms DAF on anionic metal processing fluid emulsions.

Table 3 provides the change of ester and emulsifier present in each sample of clarified metal processing fluid after DAF.

TABLE 3

| Sample | Initial Ester (%) | Final Ester (%) | Ester Change (%) | Initial Emulsifier (%) | Final Emulsifier (%) | Emulsifier Change (%) |
|---|---|---|---|---|---|---|
| 1 | 111.4 | 116.6 | 4.7 | 112.1 | 135.8 | 21.1 |
| 2 | 67.4 | 77.4 | 14.8 | 101.9 | 129.1 | 26.7 |
| 2 | 67.2 | 76.4 | 13.4 | 109.3 | 142.7 | 30.6 |
| 2 | 60.5 | 69.4 | 14.7 | 98.1 | 159.2 | 62.3 |

TABLE 3-continued

| Sample | Initial Ester (%) | Final Ester (%) | Ester Change (%) | Initial Emulsifier (%) | Final Emulsifier (%) | Emulsifier Change (%) |
|---|---|---|---|---|---|---|
| 3 | 78.4 | 92.2 | 17.6 | 69.8 | 85.5 | 22.9 |
| 1 | 39.5 | 38.5 | −2.5 | 29.3 | 24.6 | −16.0 |
| 4 | 128.4 | 123.0 | −4.2 | n/d | n/d | n/d |

These results illustrate that DAF applied to cationic metal processing fluid emulsions is successful in retaining the principle lubrication and emulsification components of the cationic metal processing fluid emulsion while removing the metal fine debris. These results also illustrate how the DAF process reduces the lubrication, i.e., ester component, and emulsification components of an anionic metal processing fluid emulsion while removing the metal fine debris.

It is noted that the increase in the concentration of each component is due to the loss of a small portion of the mineral oil component and metal debris contaminant. However, the loss of the mineral oil is not sufficient enough to significantly decrease the oil concentration of the emulsion.

All publications and priority applications, including U.S. Provisional Patent Application No. 61/921,691, filed Dec. 30, 2013, cited in this specification are incorporated herein by reference. While the invention has been described with reference to particular embodiments, it will be appreciated that modifications can be made without departing from the spirit of the invention. Such modifications are intended to fall within the scope of the appended claims.

What is claimed is:

1. A process for deforming a metal, said process comprising:
   (i) deforming a first metal with a cationic-based metal processing fluid which is substantially free of fatty acids to provide a used cationic-based metal processing fluid;
   (ii) treating said used cationic-based metal processing fluid with dissolved air floatation; and
   (iii) deforming a second metal with the cationic-based metal processing fluid from step (ii), wherein pH of the cationic-based metal processing fluid is about 5.8 to about 6.7.

2. The process according to claim 1, wherein:
   (a) said treating comprises removing suspended foreign matter from said cationic-based metal processing fluid, wherein said suspended foreign matter comprises fine metal particles; or
   (b) said suspended foreign matter cannot be removed using filtration; or
   (c) said process does not affect a balance of chemicals in the cationic-based metal processing fluid; or
   (d) said cationic-based metal processing fluid is utilized in a metal deformation process comprising metal rolling, metal drawing, or metal forming; or
   (e) fatty acids, when present, comprise non-oleic acids; or
   (f) said metal comprises iron, aluminum, copper, magnesium, tin, zinc or combinations thereof; or
   (g) said metal comprises a metal alloy; or
   (h) said cationic-based metal processing fluid comprises an emulsion; or
   (i) said cationic-based metal processing fluid comprises less than about 2% by weight of fatty acids; or
   (j) which process is performed in the absence of a filter; or performed in the absence of a flocculant; or performed in the absence of centrifugation or performed in the absence of foaming.

3. The process according to claim 2, wherein said cationic-based metal processing fluid comprises an emulsion and wherein the particles of said emulsion are about 1,000 Å to about 500,000 Å.

4. The process according to claim 2, wherein said cationic-based metal processing fluid comprises an emulsion and wherein said emulsion is an oil-in-water emulsion.

5. The process according to claim 1, wherein said cationic-based metal processing fluid comprises:
   (a) about 1% to about 20% by weight of an oil phase and about 80% to about 99% by weight of an aqueous phase; or
   (b) about 2% to about 10% by weight of said oil phase; or
   (c) further comprises a lubricating agent, emulsifier, dispersant, antioxidant, corrosion inhibitor, alkaline compound, or combination thereof; or
   (d) comprises about 1% to about 20% by weight of an oil phase comprising:
      (i) about 0.5% to about 20% by weight of a lubrication agent,
      (ii) at least 50% by weight of a solubilizing carrier,
      (iii) an emulsifier, and
      (iv) about 80% to about 99% by weight water, or
   (e) comprises about 1% to about 20% by weight of an oil phase comprising:
      (i) about 10% to about 50% by weight of a lubrication agent,
      (ii) and emulsifier,
      (iii) a solubilizing carrier, and
      (iv) about 80% to about 99% by weight water.

6. The process according to claim 1, wherein said cationic-based metal processing fluid comprises:
   (i) about 0.5% to about 12% by weight of a phosphonate ester;
   (ii) about 4% to about 50% by weight of a lubricating ester;
   (iii) about 0.5% to about 15% by weight of an emulsifier, dispersant, or combination thereof;
   (iv) about 0.1% to about 1% by weight of an antioxidant; and
   (v) about 0.1% to about 5% by weight of a corrosion inhibitor.

7. The process according to claim 6, wherein said cationic-based metal processing fluid further comprises at least 50% by weight of a solubilizing carrier.

8. The process according to claim 6, wherein said phosphonate ester is an alkyl alkylphosphonate of the formula:

wherein:
R$^1$ is C$_2$ to C$_{20}$ alkyl, substituted C$_2$ to C$_{20}$ alkyl, C$_2$ to C$_{20}$ alkenyl, substituted C$_2$ to C$_{20}$ alkenyl, C$_2$ to C$_{20}$ alkynyl, substituted C$_2$ to C$_{20}$ alkynyl, C$_6$ to C$_{20}$ aryl, and C$_6$ to C$_{20}$ alkyl aryl;
R$^2$ and R$^3$ are independently H, C$_1$ to C$_8$ alkyl, substituted C$_1$ to C$_8$ alkyl, C$_2$ to C$_8$ alkenyl, substituted C$_2$ to C$_8$ alkenyl, C$_2$ to C$_8$ alkynyl, substituted C$_2$ to C$_8$ alkynyl, C$_6$ to C$_{20}$ aryl, or C$_6$ to C$_{20}$ alkyl aryl.

9. The process according to claim 8, wherein:
(a) R$^1$ is C$_{14}$ to C$_{18}$ alkyl; or
(b) R$^2$ is H or C$_1$ to C$_4$ alkyl; or
(c) R$^3$ is H or C$_1$ to C$_4$ alkyl; or (d) $R^2$ and $R^3$ are the same or are H, methyl, ethyl, or butyl groups.

10. The process according to claim 6, comprising about 2% to about 6% by weight of said phosphonate ester; or about 24% by weight of said lubricating ester.

11. The process according to claim 6, wherein said lubricating ester is selected from the group consisting of:
(a) a polyol ester of a $C_7$ to $C_{20}$ fatty acid;
(b) a trimer or dimer acid ester of a methoxy polyethylene glycol monohydric alcohol having an average molecular weight of about 350;
(c) a trimer or dimer acid ester of a methoxy polyethylene glycol monohydric alcohol having an average molecular weight of about 350 and a $C_1$ to $C_9$ aliphatic monohydric alcohol; and
(d) combinations thereof.

12. The process according to claim 11, wherein:
(i) said polyol ester is the product resulting from the reaction of a $C_7$ to $C_{20}$ fatty acid with pentaerythritol, trimethylolpropane, trimethyolethane, neopentylglycol, or neopentylglycol monohydroxy pivalate; or
(ii) wherein said trimer ester is formed from the esterification of a polymerized unsaturated $C_{12}$ to $C_{24}$ fatty acid with a monohydric alkoxylated alcohol selected from the group consisting of a $C_1$ to $C_{24}$ aliphatic saturated alcohol alkoxylated with about 2 to about 25 moles of a $C_2$ to $C_5$ alkylene oxide, a $C_1$ to $C_4$ terminated alkoxy polyalkylene glycol alkoxylated with about 2 to about 25 moles of a $C_2$ to $C_5$ alkylene oxide, and combinations thereof; or
(iii) wherein said trimer ester is formed from the esterification of a polymerized unsaturated $C_{12}$ to $C_{24}$ fatty acid with a monohydric alkoxylated alcohol selected from the group consisting of a $C_1$ to $C_{24}$ aliphatic saturated alcohol alkoxylated with about 2 to about 25 moles of a $C_2$ to $C_5$ alkylene oxide, a $C_1$ to $C_4$ terminated alkoxy polyalkylene glycol alkoxylated with out 2 to about 25 moles of a $C_2$ to $C_5$ alkylene oxide, and combinations thereof; and an aliphatic $C_1$ to $C_{24}$ monohydric alcohol.

13. The process according to claim 6, comprising: about 0.5 to about 6% by weight of said emulsifier, dispersant, or combination thereof; or about 0.4% by weight of said antioxidant; or about 1% by weight of said corrosion inhibitor.

14. The process according to claim 6, wherein said emulsifier or dispersant is selected from the group consisting of an alkoxylated linear alcohol, alkoxylated secondary alcohol, alkoxylated alkylaryl alcohol, alkoxylated primary amine, alkoxylated amide, alkoxylated phosphate ester, alkoxylated acid, sodium petroleum sulfonate, and combinations thereof.

15. The process according to claim 7, wherein said antioxidant is selected from the group consisting butylated hydroxytoluene, butylated hydroxyanisole, and phosphites; or wherein said corrosion inhibitor is selected from the group consisting of benzotriazole, tolyltriazole, and petroleum sulfonate; or wherein said carrier has a viscosity greater than or equal to about 50 to about 3000 Saybolt Universal Seconds at 100° F.

16. The process according to claim 7, wherein said carrier is a hydrocarbon oil and is a mineral oil, naphthenic hydrocarbon oil, paraffinic hydrocarbon oil, poly α-olefin, alkylbenzene, polyisobutylene, or polypropylene or is an ester or lubricating ester.

17. The process according to claim 6, further comprising about 0.1% to about 5% by weight of an alkaline compound selected from an alkanolamine consisting of monoethanolamine, triethanolamine, aminomethyl propanol, monoisopropanol amine, triisopropanolamine, and diglycolamine, alkali hydroxide, sodium hydroxide or potassium hydroxide, alkylamine, N-alkylalkanol amine, and combinations thereof.

18. The process according to claim 1, wherein said cationic-based metal processing fluid comprises:
(a) about 0.5% to about 12% by weight of a phosphonate ester; about 4% to about 50% by weight of a lubricating ester; about 0.5% to about 15% by weight of an emulsifier, dispersant, or combination thereof; about 0.1% to about 1% by weight of an antioxidant; and about 0.1% to about 5% by weight of a corrosion inhibitor; and about 50% to about 85% by weight of a carrier or at least 50% by weight of a solubilizing carrier; and optionally about 0.1% to about 5% by weight of an alkaline compound; or
(b) about 1% to about 10% by weight of a phosphonate ester; about 4% to about 25% by weight of a trimer acid ester of a methoxypolyethylene glycol monohydric alcohol having an average molecular weight of about 350, a $C_1$ to $C_9$ aliphatic monohydric alcohol, or combinations thereof; about 1% to about 15% by weight of an emulsifier, dispersant, or combination thereof; about 0.1% to about 5% by weight of an alkaline compound; about 0.1% to about 1% by weight of an antioxidant; about 0.1% to about 5% by weight of a corrosion inhibitor; and about 50% to about 85% by weight of a hydrocarbon oil; or
(c) about 1% to about 10% by weight of a phosphonate ester; about 4% to about 25% by weight of a trimer acid ester of a methoxypolyethylene glycol monohydric alcohol having an average molecular weight of about 350, a $C_1$ to $C_9$ aliphatic monohydric alcohol, or combinations thereof; about 1% to about 15% by weight of an emulsifier, dispersant, or combination thereof; about 4% to about 20% by weight of a polyol ester of a $C_7$ to $C_{20}$ fatty acid; about 0.1% to about 1% by weight of an antioxidant; about 0.1% to about 5% by weight of a corrosion inhibitor; about 0.1% to about 5% by weight of an alkaline compound; and about 50% to about 85% by weight of a hydrocarbon oil; or
(d) about 1% to about 20% by weight of an oil phase, comprising about 0.5% to about 12% by weight of a phosphonate ester; and at least 50% by weight of a solubilizing carrier; and about 80% to about 99% by weight water; or
(e) about 1% to about 20% by weight of an oil phase, comprising: about 1% to about 10% by weight of a phosphonate ester; about 1% to about 15% by weight of an emulsifier, dispersant, or combination thereof; about 4% to about 50% by weight of a lubricating ester; about 50% to about 85% by weight of a carrier; and about 0.1% to about 5% by weight of an alkaline compound; and about 80% to about 99% by weight water; or
(f) about 1% to about 20% by weight of an oil phase, comprising: about 1 to about 10% by weight of a phosphonate ester; about 4 to about 25% by weight of a trimer acid ester of a methoxypolyethylene glycol monohydric alcohol having an average molecular weight of about 350, a $C_1$ to $C_9$ aliphatic monohydric alcohol, or combinations thereof; about 1% to about 15% by weight of an emulsifier, dispersant, or combination thereof; about 0.1% to about 1% by weight of an antioxidant; about 0.1% to about 5% by weight of a corrosion inhibitor; about 50% to about 85% by weight of a hydrocarbon oil; and about 0.1% to about 5% by weight of an alkaline compound; and about 80% to about 99% by weight water; or
(g) about 1% to about 20% by weight of an oil phase, comprising: about 1% to about 10% by weight of a phosphonate ester; about 4% to about 25% by weight of a trimer acid ester of a methoxypolyethylene glycol monohydric alcohol having an average molecular weight of about 350, a $C_1$ to $C_9$ aliphatic monohydric alcohol, or combinations thereof; about 4% to about 20% by weight of a polyol ester of a $C_7$ to $C_{20}$ fatty acid; about 1% to about 15% by weight of an emulsifier, dispersant, or combination thereof; about 0.1% to about 5% by weight of a corrosion inhibitor; about 0.1% to about 1% by weight of an antioxidant; about 50% to about 85% by weight of a hydrocarbon oil; and about 0.1% to about 5% by weight of an alkaline compound; and about 80% to about 99% by weight water.

19. A process for removing suspended foreign matter from a contaminated cationic-based metal processing fluid which is substantially free of fatty acids, said process comprising:
   (a) providing said contaminated cationic-based metal processing fluid into a tank;
   (b) introducing a portion of said contaminated cationic-based metal processing fluid from step (a) into a vessel, wherein said vessel is pressurized to saturate said cationic-based metal processing fluid;
   (c) introducing said saturated cationic-based metal processing fluid into said tank;
   (d) mixing said saturated cationic-based metal processing fluid with said contaminated cationic-based metal processing fluid in said tank;
   (e) permitting the pressure in said tank to lessen to permit the formation of bubbles in said tank, wherein said bubbles adhere to and carry said suspended foreign matter from said contaminated cationic-based metal processing fluid to the upper layer of said contaminated cationic-based metal processing fluid; and
   (f) removing said suspended foreign matter from said upper layer;
   wherein said process is performed without removing the emulsion of the cationic-based metal processing fluid and wherein said bubbles are less than about 1000μ, and
   wherein the pH of the cationic-based metal processing fluid is about 5.8 to about 6.7.

20. An improved process for cleaning a cationic-based metal processing fluid which is substantially free of fatty acids and suspended metal particles, the improvement comprising performing said process using dissolved air floatation in the absence of filtration,
   wherein the pH of the cationic-based metal processing fluid is about 5.8 to about 6.7.

* * * * *